Patented Sept. 6, 1932

1,876,435

UNITED STATES PATENT OFFICE

KARL SCHÖLLKOPF, OF DUSSELDORF-OBERKASSEL, AND ARTHUR SERINI, OF DUSSELDORF-HEERDT, GERMANY, ASSIGNORS TO RHEINISCHE KAMPFER-FABRIK GESELLSCHAFT MIT BESCHRANKTER HAFTUNG, OF DUSSELDORF-OBERKASSEL, GERMANY

PREPARING THYMOL (3-OXY-1-METHYL-4-ISOPROPYL-BENZOL)

No Drawing. Application filed September 20, 1928, Serial No. 307,336, and in Germany October 12, 1927.

The present invention relates to a process for preparing thymol (3-hydroxy-1-methyl-4-isopropyl-benzene) from propyl derivatives of meta-cresol isomeric with thymol. The propyl derivatives of the meta-cresols are derived from the m-cresol by substituting hydrogen atoms of the nucleus or of the hydroxyl group respectively by the group $C_3H_7$, that is by the normal propyl group $CH_3.CH_2.CH_2$ and the isopropyl group

In the patent application No. 289,612 of the 30th June 1928, there is described the addition of propylene to meta-cresol with the formation of thymol and other propyl derivatives of meta-cresol. It has now been found that on heating the propyl derivatives of meta-cresol isomeric with thymol at elevated temperatures, the reverse reaction—i. e. the splitting off of propylene—may also be effected and that by both reactions—i. e. the splitting off and re-addition of propylene—which take place simultaneously on heating the propyl derivatives of meta-cresol isomeric with thymol to about 330—400° C., a wandering of the propyl group is effected. It was further found that this wandering takes place in such a manner that thymol is predominantly formed.

According to the present process the propyl derivatives of metal-cresol isomeric with thymol and having the formula $C_{10}H_{14}O$, that is the meta-cresols having a free hydroxyl group and propylated in the nucleus as well as the meta-cresols propylated or at the oxygen atom—i. e. the propyl or ethers of meta-cresol—may be subjected by heating to a conversion (isomerization). In this way products propylated only in the nucleus, which consist chiefly of thymol of melting point 51° C. and boiling point 232° C. at 760 mm. as well as the isomeric thymol (3-hydroxyl-1-methyl-6-isopropyl-benzene) of melting point 114° C. and boiling point 245—246° C. at 760 mm. are obtained. The thymol may be separated by fractional distillation from the isomer, small quantities of meta-cresol and di-propylated metal-cresols.

By repeated treatment of the by-products obtained a complete conversion of the propyl derivatives of the meta-cresol into thymol may be obtained.

It has further been found that the reactions mentioned may be effected with the help of catalysts in a technically more simple manner, especially at considerably lower temperatures, than without catalysts. The following substances having a condensing and dehydrating action are suitable as catalysts; inorganic and organic acids and their derivatives, for example, sulphuric acid, hydrochloric acid, the various phosphoric acids, sulphonic acids, phosphoric anhydride, phosphoric acid chloride and the like; metal oxides, for example, aluminium oxide, thorium oxide, tungstic oxide and the like; metal salts, for example, zinc chloride, aluminium chloride, ferric chloride, magnesium chloride, potassium bisulphate, potash alum, aluminium sulphate, aluminium phosphate, aluminium silicate, other metallic silicates and the like; contact substances, for example, active charcoal, silica gels, kieselguhr, kaolin, clay, fuller's earths, bleaching earths, siliceous earths and the hydrosilicates obtained from the above mentioned silicates by the action of acids and the like.

The catalysts may be employed in several different ways, either alone or mixed with one another or deposited on carriers, which may consist of any of the above mentioned contact substances or of other substances; for example, pumice stone, barium sulphate and the like.

Finally it has been found that the isomerization of the meta-cresol derivatives mentioned is much more readily effected and at lower temperatures, if these substances are converted into compounds, which are identical with the intermediary compounds formed in the catalytical isomerization.

A mixture of thymol and the isomer of melting point 114° C. which may be separated by fractional distillation, is then obtained by decomposing the isomerized compounds.

As already stated the above mentioned reactions depend on the wandering of the propyl group. As in this reaction propylene is in most cases formed the reactions are preferably carried out in closed apparatus in order to avoid losses of propylene. Whenever propylene does not appear in the reactions described in the following examples, the reactions may be carried out in open apparatus.

Examples

1. Isopropyl-meta-cresyl-ether of boiling point 196° to 197° C. at 760 mm. which may be prepared according to the process of the patent application No. 289,612 or by any other known alkylating methods, for example according to the process of Claisen [see Liebigs Annalen der Chemie, vol. 401, page 29, (1913)], is heated for about 6 hours to about 340—350° C. in an autoclave, preferably with stirring. The isomerization product obtained is fractionally distilled, preferably in vacuo. The first fraction, which consists of meta-cresol, and the last fraction, which contains the isomeric thymol of melting point 114° C. may be separated from the middle fraction which contains the thymol. The distillation residue contains di-propyl meta-cresols. Thymol crystallizes from the thymol fraction after cooling and seeding with a crystal and is obtained completely pure by separating by centrifuging and crystallizing from benzine. It has a melting point of 51° C.

2. Propyl-meta-cresyl-ether of boiling point 210.6° C. (for its preparation see Pinette Liebigs Annalen der Chemie, vol. 243, page 41) is heated to about 350—360° C. in an autoclave with stirring for about 20 hours. Thymol and the by-products are obtained from the isomerization product as in Example 1.

3. 3-hydroxy-1-methyl-2-isopropyl, benzene of melting point 69° C. and boiling point 228—229° C. which may be prepared according to the process of patent application No. 289,612 and which is isomeric with thymol, is heated for about 15 hours at about 350° C. in an autoclave with stirring. Thymol and the by-products are obtained from the isomerization product as in Example 1.

4. 3-hydroxy-1-methyl-6-isopropyl-benzene of melting point 114° C. and boiling point 245—246° C. which may be prepared according to the patent application No. 289,612 or may be obtained by the process of the German patent specifications Nos. 350,809 and 400,969 as a product having a melting point of 114—115° C. or may be obtained as a by-product according to the above examples and which is isomeric with thymol, is heated for about 30 hours to about 380° C. in an autoclave with stirring.

Thymol and the by-products are obtained from the isomerization product as in Example 1.

5. Isopropyl-meta-cresyl-ether is heated with 10 to 20% of a catalyst having a condensing and dehydrating action, for example anhydrous zinc chloride, about 100% phosphoric acid, about 100% sulphuric acid, phosphoric anhydride or one of the activated bleaching earths occurring in commerce, for about 24 hours to about 200° C. in an autoclave with stirring. Thymol and the by-products are obtained from the isomerization product as in Example 1.

6. The isomeric thymol having a melting point of 114° C. is heated with 10 to 20% of one of the catalysts mentioned in Example 5 for 12 to 15 hours to about 230° C. in an autoclave with stirring. Thymol and the by-products are obtained from the isomerization product as in Example 1.

7. The substances or mixtures of substances employed as starting materials in Examples 1 to 6, are passed in vapor form at about 180° to 350° C. over a contact mass having a condensing and dehydrating action. The contact mass may, for example, be aluminium oxide, which has been shaped or compressed while wet into pieces and then been dried. The contact mass may further consist, for example, of thorium oxide mounted on pumice, aluminium phosphate or aluminium hydroxide deposited on kieselguhr, phosphoric acid—or zinc chloride containing active charcoal, brick clay, fuller's earth or one of the activated bleaching earths occurring in commerce, preferably in the form of pieces about the size of a bean. The rate at which the reacting substances are passed through one of the usual contact apparatus is so regulated that a maximum yield of thymol is obtained. The rate of passage is further dependent on the contact substance employed, the length and volume of the contact space and the reaction temperature. Thymol and the by-products are obtained as in the above mentioned examples from the reaction products obtained. The propylene obtained by partial splitting off may be employed according to the process of patent application No. 289,612 for condensing with meta-cresol in order to obtain further thymol.

8. 2 parts of about 96 to 100% sulphuric acid are added with stirring to 1 part of iso-propyl-meta-cresyl-ether. The ether dissolves under spontaneous development of heat (about 80 to 100° C.) in the sulphuric acid whereby the sulphonic acid of the ether first formed is spontaneously converted to the sulphonic acids of the isomers propylated in the nucleus. On cooling the latter sulphonic acids crystallize out and may be isolated and hydrolyzed in a manner known per se. Preferably, however, the hydrolysis of the sulphonic acids is effected without first isolating the latter. For this purpose the sulphonation mixture obtained after the conversion is diluted with the same quantity of water and the thymol-isomers mixture separated with superheated steam at about 120° to 160° C. The thymol-isomers mixture is fractionally distilled, preferably in vacuo. The first and main portion contains the thymol of melting point 51° C. and boiling point 232° C. at 760 mm., the second fraction the isomer of thymol having a melting point of 114° C. and a boiling point of 245° to 246° C.

9. To 1 part of propyl-meta-cresyl-ether, 2 parts of about 96 to 100% sulphuric acid are added with stirring. The sulphonic acid of the ether first formed is then converted by heating the sulphonation mixture to about 90° to 100° C. for about 1 hour into the sulphonic acid of thymol and its isomer. The hydrolysis of the sulphonic acids obtained by the conversion and the isolation of the thymol is effected as in Example 8.

10. The isomeric thymol having a melting point of 114° C. is sulphonated with twice the quantity of 96% sulphuric acid at about 90° to 100° C. with stirring, and the resultant sulphonic acid converted by further heating at the same temperature. The time of sulphonation and conversion amounts in all to about 6 hours. The hydrolysis of the sulphonic acids obtained by the conversion and the isolation of the thymol is effected as in example 8. In order to avoid even a trifling depropylation with formation of meta-cresol the sulphonation and the conversion is preferably effected in an autoclave.

11. Isopropyl-meta-cresyl-ether is heated with half the quantity of phosphorus pentoxide to about 130° C. for about 3 hours. The phosphorus pentoxide dissolves owing to reaction with the ether under formation of phosphoric acid esters while a wandering of the isopropyl group from the oxygen in the nucleus takes place at the same time. By saponifying the ester the thymol-isomers mixture is obtained which is separated by fractional distillation into thymol and the isomer of melting point 114° C.

12. The isomeric thymol of melting point 69° C. is heated with half the quantity of phosphorus pentoxide or with a corresponding quantity of phosphorus pentoxide-containing phosphoric acid for about 5 to 10 hours to about 210° to 230° C. with stirring, preferably in an autoclave. The hydrolysis of the resulting phosphoric acid ester and the isolation of the thymol is effected as in Example 11.

13. Molecular quantities of the thymol isomer of melting point 69° C. and anhydrous aluminium chloride are heated to about 50° to 60° C. in an inert solvent such, for example, as carbon bisulphide. By the splitting off of one molecule of hydrochloric acid a compound results which is analogous to that prepared by Perrier (see Bulletin de la Soc. Chimique di France (3) 15 1183). The compound is heated for several hours, preferably in an inert solvent such, for example, as carbon bisulphide, if desired in a closed vessel, to about 60° to 80° C. when isomerization takes place. The isomerized compound is then hydrolyzed with water and the mixture of isomers obtained fractionally distilled, when thymol and the isomer of melting point 114° C. are obtained.

What we claim is:

1. A process for preparing thymol (3-hydroxy-1-methyl-4-isopropyl-benzene) consisting in isomerizing the propyl derivatives of meta-cresol isomeric with thymol by heating the said isomeric derivatives to about 330—400° C. and in subjecting the isomerization product to fractional distillation.

2. A process for preparing thymol (3-hydroxy-1-methyl-4-isopropyl-benzene) consisting in isomerizing the propyl derivatives of meta-cresol isomeric with thymol by heating the said isomeric derivatives at temperatures up to 330° C. in the presence of catalysts having a condensing and dehydrating action and in subjecting the isomerization product to fractional distillation.

3. A process for preparing thymol (3 hydroxy-1 methyl-4 isopropyl-benzene) comprising the steps of forming intermediary compounds by combining propyl derivatives of meta-cresol, isomeric with thymol, with the materials promoting the catalysis, isomerizing said intermediary compounds by heating same at temperatures up to 330° C., hydrolyzing the reaction product and subjecting the mixture thus obtained to fractional distillation.

In testimony whereof we hereunto affix our signatures this 4th day of September, 1928.

KARL SCHÖLLKOPF.
ARTHUR SERINI.